(12) United States Patent
Gong et al.

(10) Patent No.: US 8,472,180 B2
(45) Date of Patent: Jun. 25, 2013

(54) HARD DISK MODULE AND HARD DISK SECURING APPARATUS THEREOF

(75) Inventors: Xin-Hu Gong, Shenzhen (CN); Gao-Liang Xia, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 13/051,017

(22) Filed: Mar. 18, 2011

(65) Prior Publication Data

US 2012/0176743 A1   Jul. 12, 2012

(30) Foreign Application Priority Data

Jan. 8, 2011   (CN) .......................... 2011 1 0003183

(51) Int. Cl.
*H05K 7/12*   (2006.01)
(52) U.S. Cl.
USPC .............. 361/679.33; 361/679.01; 312/223.1; 248/27.1
(58) Field of Classification Search
USPC ............... 361/679.01–679.61, 724–727, 752, 361/728; 312/223.1–223.2; 248/675, 544, 248/689, 551, 221.11, 222.51, 225.11, 27.3
See application file for complete search history.

(56) References Cited

U.S. PATENT DOCUMENTS 8,369,077 B2 *   2/2013   Peng et al. ............... 361/679.33

* cited by examiner

*Primary Examiner* — Jinhee J. Lee
*Assistant Examiner* — Ingrid Wright
(74) *Attorney, Agent, or Firm* — Altis Law Group, Inc.

(57) ABSTRACT

A securing apparatus for securing a hard disk with two opposite sidewalls includes a connecting rod, a first securing plate, a second securing plate, a supporting rod, and a locking handle. The connecting rod includes a first end portion and a second end portion. The first securing plate has an end fixed to the first end portion of the connecting rod. The second securing plate has an end pivotably connected to the second end portion of the connecting rod, the second securing plate includes a locking member. The supporting rod has a first end fixed to the first securing plate, and a second end opposite to the first end. The locking handle is pivotably connected to the second end of the supporting rod, the locking handle is able to be locked by the locking member to keep the second securing plate clamped to the hard disk.

20 Claims, 6 Drawing Sheets

HARD DISK MODULE AND HARD DISK SECURING APPARATUS THEREOF

BACKGROUND

1. Technical Field

The present disclosure relates to hard disks and, particularly, to a hard disk securing apparatus.

2. Description of Related Art

At present, hard disks are important components in some electronic devices, such as computers and servers. At present, a hard disk is typically fixed to a bracket in the electronic device by screws, as a result, specialized tools, such as screwdrivers, need to be used for disassembling or assembling the hard disk, so, it is inconvenient for users to disassemble or assemble the hard disk.

What is needed is a hard disk securing apparatus which can ameliorate the problem of the prior art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments of the present disclosure will now be described in detail below, with reference to the accompanying drawing.

Figure 1:
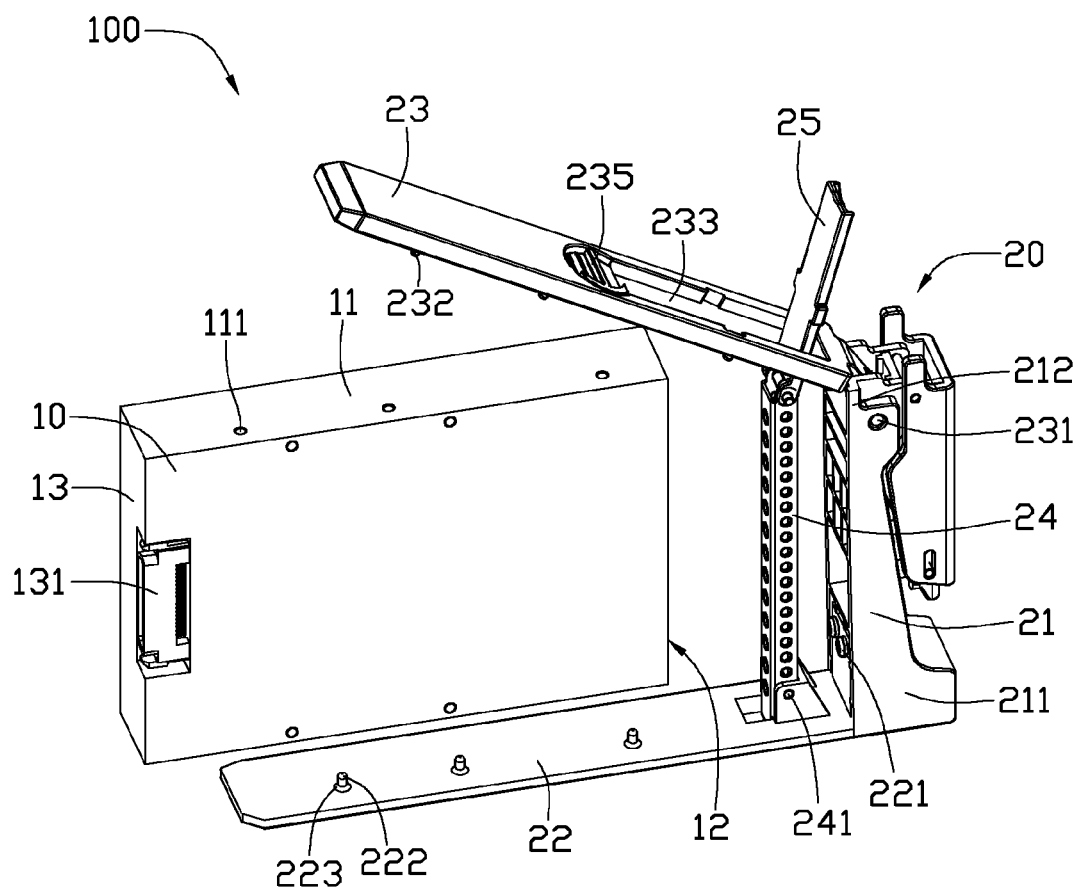
FIG. 1 is a schematic view of a hard disk module after a hard disk thereof being disassembled according to an exemplary embodiment.

Referring to FIG. 1, a hard disk module 100 according to an exemplary embodiment is shown. The hard disk module 100 includes a hard disk 10 and a securing apparatus 20.

The hard disk 10 includes two opposite sidewalls 11, a front end surface 12, and a back end surface 13. The front end surface 12 and the back end surface 13 are connected between the two opposite sidewalls 11. Each sidewall 11 defines a number of fixing holes 111 thereon, the number of fixing holes 111 are arranged on each sidewall 11 along a lengthwise direction of the sidewall 11. A connecting interface 131 is disposed on the back end surface 13, the connecting interface 131 is configured for connecting the hard disk 10 to other apparatus, such as a circuit board, etc.

The securing apparatus 20 includes a connecting rod 21, a first securing plate 22, a second securing plate 23, a supporting rod 24, and a locking handle 25.

The connecting rod 21 faces the front end surface 12 of the hard disk 10, and extends along a lengthwise direction of the front end surface 12. The connecting rod 21 includes a first end portion 211 and a second end portion 212 opposite to the first end portion 211.

The first securing plate 22 has an end fixed to the first end portion 211 of the connecting rod 21, and is substantially perpendicular to the connecting rod 21. In the present embodiment, the first securing plate 22 is fixed to the connecting rod 21 by a number of screws 221. The first securing plate 22 extends along a lengthwise direction of the sidewall 11 of the hard disk 10, and has a number of protrusions 222 on an inner surface thereof which faces the hard disk 10. The protrusions 222 are arranged along a lengthwise direction of the first securing plate 22. The protrusions 222 are configured for engaging with the fixing holes 111 on the sidewall 11 of the hard disk 10 to fix the hard disk 10. Preferably, each of the protrusions 222 is sleeved by a cushion collar 223.

The second securing plate 23 and the first securing plate 22 cooperatively clamp two sidewalls 11 of the hard disk 10. The second securing plate 23 has a rotatable shaft 231 at an end thereof. The second securing plate 23 is pivotably connected to the second end portion 212 of the connecting rod 21 via the rotatable shaft 231. The second securing plate 23 is rotatable relative to the connecting rod 21 to move towards or move away from the first securing plate 22. Preferable, in order to increase the frictional force between the connecting rod 21 and the rotatable shaft 231, the rotatable shaft 231 can be interface fit with the connecting rod 21. The second securing plate 23 includes a number of protrusions 232 on an inner surface of the second securing plate 23 facing towards the hard disk 10. The protrusions 232 are configured for engaging with the fixing holes 111 on the sidewall 11 of the hard disk 10 to fix the hard disk 10.

Figure 2:
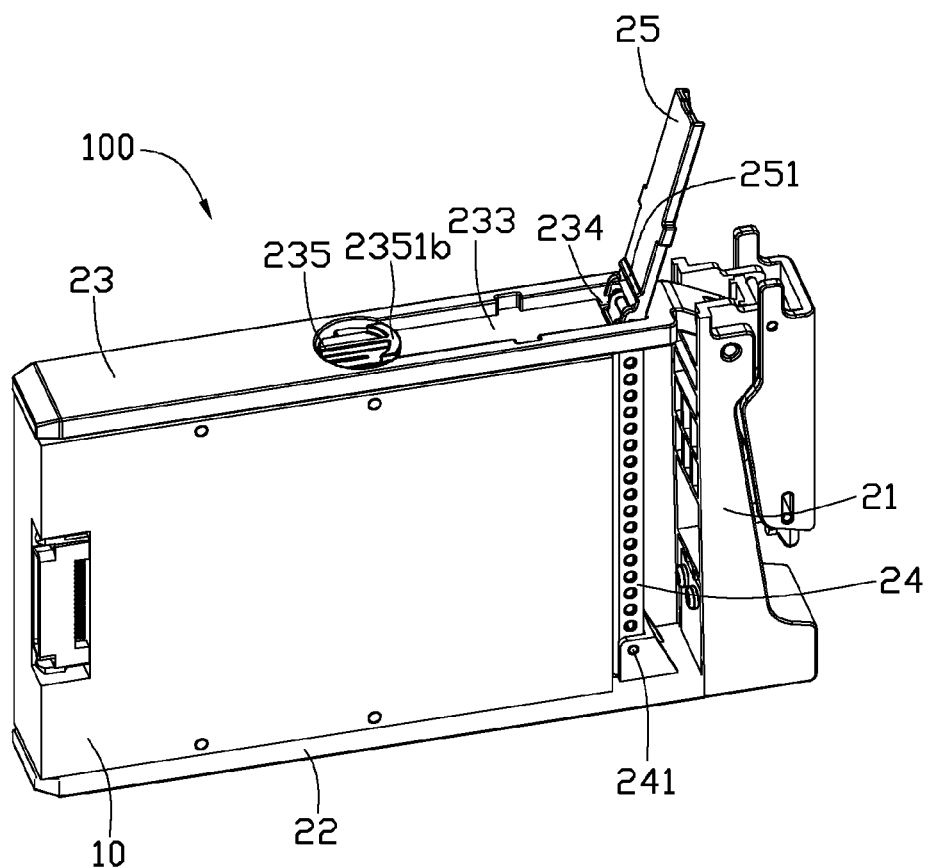
FIG. 2 is a schematic view of the hard disk module of FIG. 1 during assembling the hard disk.
Figure 3:
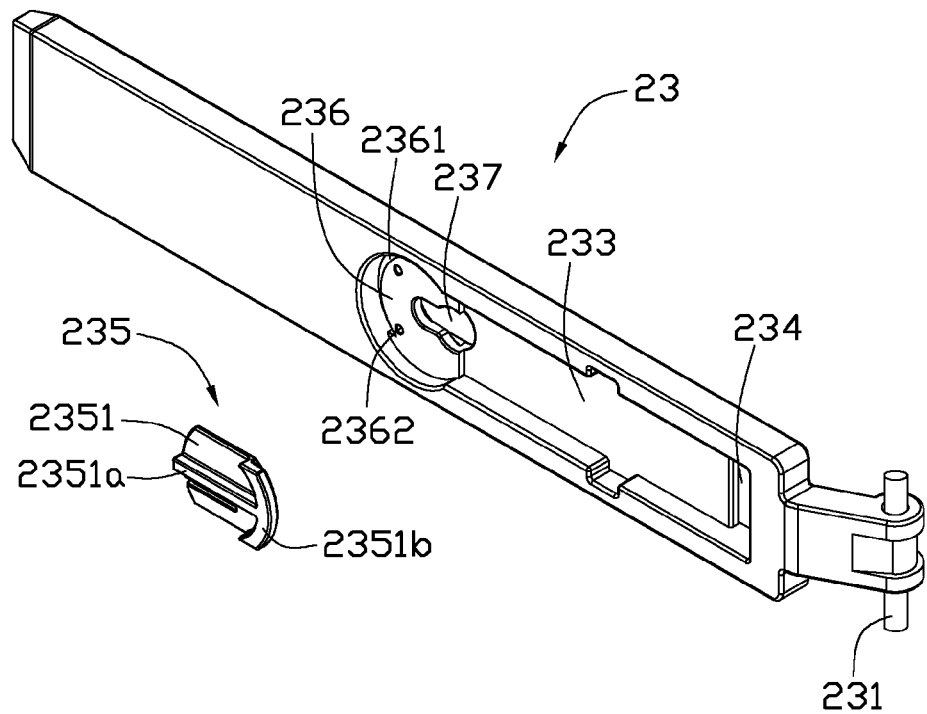
FIG. 3 is a schematic, exploded view of a second securing plate of the hard disk module of FIG. 1.
Figure 4:
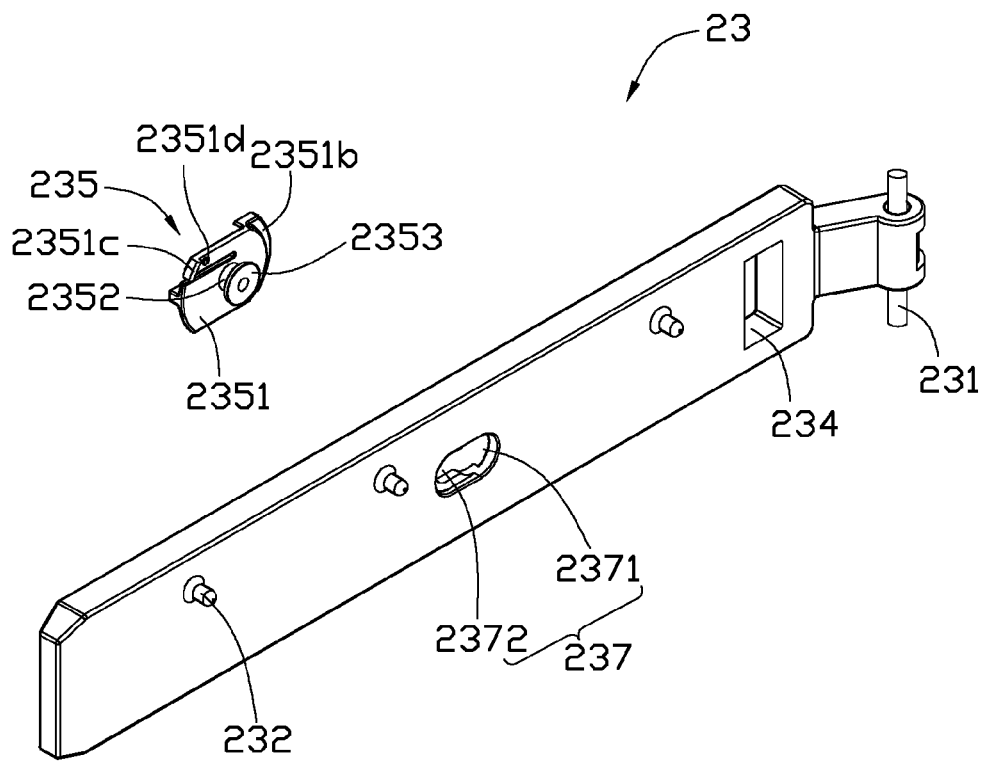
FIG. 4 is a schematic, exploded view of the second securing plate of FIG. 3 viewed from another side.

Further referring to FIGS. 2 to 4, an outer surface of the second securing plate 23 away from the first securing plate 22 defines a receiving groove 233 and a through hole 234. The through hole 234 is arranged at an end of the receiving groove 233, and runs through the outer surface and the inner surface of the second securing plate 23. The second securing plate 23 further includes a locking member 235 arranged at an end of the receiving groove 233 away from the through hole 234, the locking member 235 is configured for locking the locking handle 25.

In the present embodiment, the locking member 235 is a rotatable locking button, and includes a main body 2351 (FIG. 3), a rotatable shaft 2352 (FIG. 4), and a blocking plate 2353.

The main body 2351 is disk-shaped with a first surface away from the first securing plate 22 and a second surface facing the first securing plate 22. An operation portion 2351a is formed on the first surface for users to rotate the main body 2351 conveniently. The main body 2351 includes a locking portion 2351b at a lateral side thereof, the locking portion 2351b can lock the locking handle 25 or release the locking handle 25 by rotating the main body 2351. The main body 2351 includes a rotate limiting protrusion 2351c and a positioning protrusion 2351d formed on the second surface thereof.

The rotatable shaft 2352 connects between the second surface of the main body 2351 and the blocking plate 2353. Both of the diameter of the blocking plate 2353 and the diameter of the main body 2351 are larger than the diameter of the rotatable shaft 2352.

The second securing plate 23 defines a mounting groove 236 and a mounting hole 237 corresponding the rotatable locking button. The mounting groove 236 is defined on the outer surface of the second securing plate 23 for receiving the main body 2351. The mounting hole 237 runs through the bottom wall of the mounting groove 236 and the inner surface of the second securing plate 23.

The mounting hole 237 has a wide end 2371 and a narrow end 2372. The diameter of the blocking plate 2353 is smaller than that of the wide end 2371, and is larger than that of the narrow end 2372. The diameter of the narrow end 2372 is larger than that of the rotatable shaft 2352. During assembling the rotatable locking button, the blocking plate 2353 can be inserted into the mounting hole 237 from the wide end 2371 first, and then pushes the rotatable shaft 2352 into the narrow end 2372 of the mounting hole 237, thus, the rotatable locking button can be assembled onto the second securing plate 23.

The bottom wall of the mounting groove 236 defines an arc-shaped sliding slot 2361 and two positioning grooves 2362 thereon. The rotate limiting protrusion 2351c of the main body 2351 can slide along the sliding slot 2361, the range of rotatable angle of the rotatable locking button can be limited by the engagement between the rotate limiting protrusion 2351c and the sliding slot 2361. Preferably, the range of rotatable angle of the rotatable locking button is from 0 degree to 90 degrees. The rotatable locking button can be positioned by the engagement between the positioning grooves 2362 and the positioning protrusion 2351d of the main body 2351. It is understood, in other embodiments, the mounting groove 236 can be ignored, and the main body 2351 can be disposed on the outer surface of the second securing plate 23, in that case, the sliding slot 2361 and two positioning grooves 2362 can be defined on the outer surface of the second securing plate 23.

It should be understood, the locking member 235 is used for locking the locking handle 25, the structure of the locking member 235 is not limited to the present embodiment.

Figure 5:
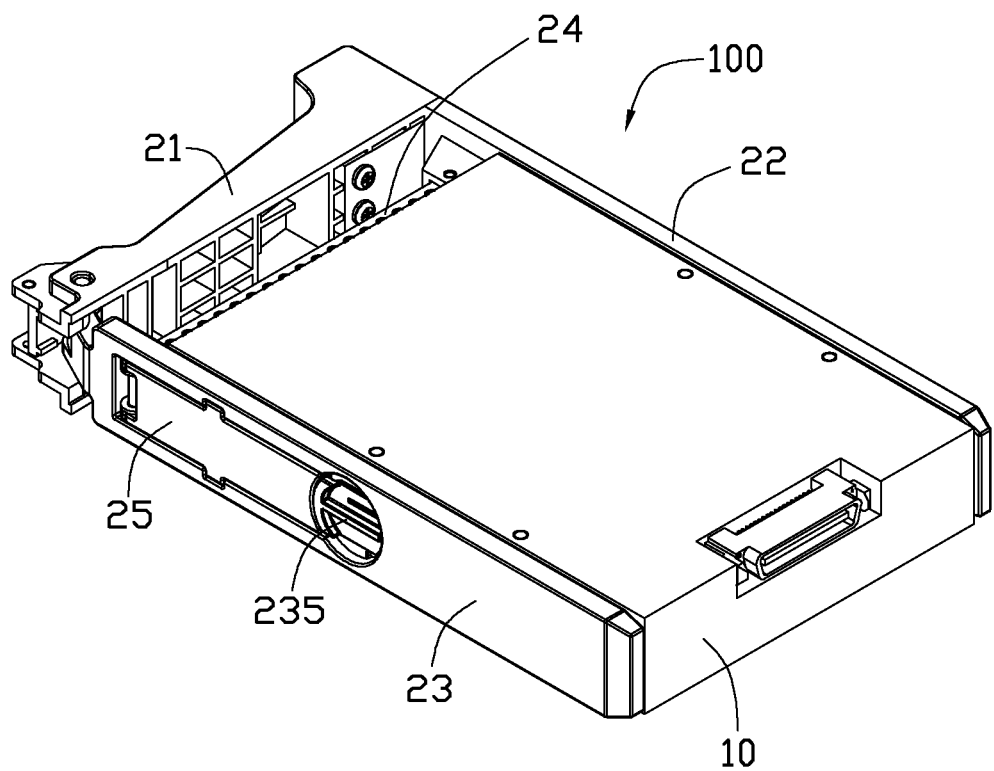
FIG. 5 is a schematic view of the hard disk module of FIG. 1 after the hard disk thereof being assembled.
Figure 6:
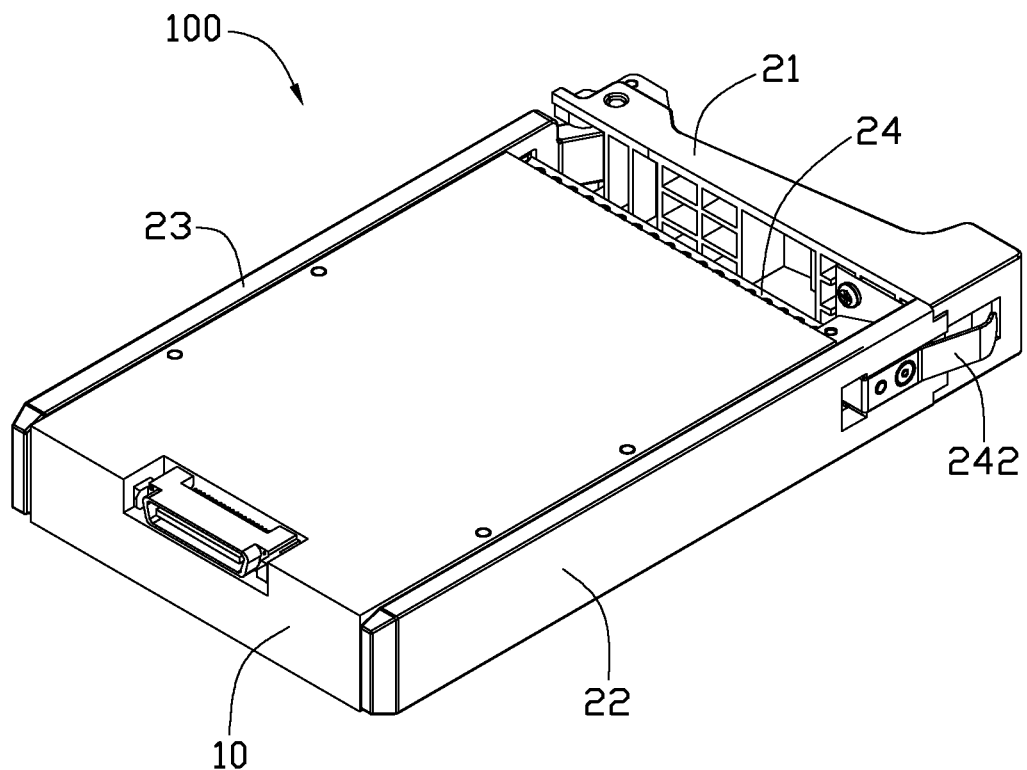
FIG. 6 is a schematic view of the hard disk module of FIG. 5 viewed from another side.

Further referring to FIGS. 5 and 6 together, the supporting rod 24 includes a first end adjacent to the first securing plate 22 and a second end adjacent to the second securing plate 23. The first end of the supporting rod 24 is fixed to the first securing plate 22 by a pin bolt 241, the second end of the supporting rod 24 is pivotably connected to the locking handle 25. The second end of the supporting rod 24 can be inserted into the through hole 234 of the second securing plate 23, and the locking handle 25 can extend out of the through hole 234 to engage with the locking member 235 of the second securing plate 23. In the present embodiment, a ground connection sheet 242 extends from the first end of the supporting rod 24, the ground connection sheet 242 can be integrally formed with the supporting rod 24. Both of the supporting rod 24 and the ground connection sheet 242 can be made of metal. The ground connection sheet 242 is bent towards the connecting rod 21, and is attached to an outer surface of the first securing plate 22 away from the second securing plate 23. The supporting rod 24 is located between the hard disk 10 and the connecting rod 21, thus, the supporting rod 24 would not block the connecting interface 131 of the hard disk 10, and users can connect the connecting interface 131 with other apparatus conveniently.

The locking handle 25 is rotatable relative to the supporting rod 24, and can be received into the receiving groove 233 of the second securing plate 23. An end of the locking handle 25 away from the supporting rod 24 can be locked to attach to the bottom wall of the receiving groove 233 by the locking member 235. The second securing plate 23 can also not define the receiving groove 233, and the locking handle 25 can be locked to attach to the outer surface of the second securing plate 23. The locking handle 25 can further includes a ridge-shaped projection 251 on a surface thereof facing the receiving groove 233, the projection 251 is perpendicular to the lengthwise direction of the second securing plate 23. The projection 251 can be functioned as a fulcrum of a lever during locking the locking handle 25.

In the process of fixing the hard disk 10 to the securing apparatus 20, the second securing plate 23 can be rotated away from the first securing plate 22 first for conveniently putting the hard disk 10 into the space between the first securing plate 22 and the second securing plate 23. Then, the hard disk 10 can be attached to the first securing plate 22 with a sidewall 11 of the hard disk 10 contacting the inner surface of the first securing plate 22. After that, the second securing plate 23 can rotate to contact the other sidewall 11 of the hard disk 10 to clamp the hard disk between the first securing plate 22 and the second securing plate 23. At last, the hard disk 10 can be fixed to the securing apparatus by locking the locking handle 25 by the locking member 235.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope and spirit of the appended claims.

What is claimed is:

1. A securing apparatus for securing a hard disk with two opposite sidewalls, the securing apparatus comprising:
   a connecting rod comprising a first end portion and a second end portion;
   a first securing plate comprising an end fixed to the first end portion of the connecting rod;
   a second securing plate comprising an end pivotably connected to the second end portion of the connecting rod, the second securing plate and the first securing plate configured for cooperatively clamping the two sidewalls of the hard disk, the second securing plate comprising a locking member;
   a supporting rod having a first end fixed to the first securing plate, and a second end opposite to the first end; and
   a locking handle pivotably connected to the second end of the supporting rod, the locking handle being able to be locked by the locking member to keep the second securing plate clamped to the hard disk together with the first securing plate.

2. The securing apparatus as claimed in claim 1, wherein the second securing plate has a rotatable shaft for pivotably connecting to the second end portion of the connecting rod, and the rotatable shaft is interface fit with the connecting rod.

3. The securing apparatus as claimed in claim 1, wherein the second securing plate comprises an inner surface facing the first securing plate and an outer surface facing away from the first securing plate, and defines a through hole running through the inner surface and the outer surface, the locking member is disposed on the outer surface of the second securing plate, the second end of the supporting rod is able to be inserted into the through hole and the locking handle extends out of the through hole to engage with the locking member.

4. The securing apparatus as claimed in claim 3, wherein the second securing plate defines a receiving groove for receiving the locking handle, the locking member and the through hole are located at two opposite end of the receiving groove.

5. The securing apparatus as claimed in claim 3, wherein the locking member is a rotatable locking button, the rotatable locking button comprises a main body and a rotatable shaft, the main body is rotatable together with the rotatable shaft and has a locking portion at a lateral side thereof for locking the locking handle.

6. The securing apparatus as claimed in claim 5, wherein the locking button further comprises a blocking plate connected to an end of the rotatable shaft away from the main body, the second securing plate defines a mounting hole for receiving the rotatable shaft therein, the blocking plate and the main body of the locking button are located at two opposite side of the second securing plate.

7. The securing apparatus as claimed in claim 6, wherein the mounting hole has a wide end and a narrow end, the diameter of the wide end is larger than that of the blocking plate, the diameter of the narrow end is larger than that of the rotatable shaft and is smaller than that of the blocking plate.

8. The securing apparatus as claimed in claim 5, wherein the main body comprises a mounting groove for receiving the main body, a bottom wall of the mounting groove defines an arc-shaped sliding slot thereon, and the main body comprises a positioning protrusion for engaging with the sliding slot to limit the range of rotatable angle of the rotatable locking button.

9. The securing apparatus as claimed in claim 1, wherein the locking handle comprises a ridge-shaped projection on a surface thereof facing the locking member, the ridge-shaped projection is substantially perpendicular to a lengthwise direction of the second securing plate.

10. A hard disk module comprising:
a hard disk with two opposite sidewalls; and
a securing apparatus for securing the hard disk, the securing apparatus comprising:
a connecting rod comprising a first end portion and a second end portion;
a first securing plate with an end fixed to the first end portion of the connecting rod;
a second securing plate with an end pivotably connected to the second end portion of the connecting rod, the second securing plate and the first securing plate configured for cooperatively clamping the two sidewalls of the hard disk, the second securing plate comprising a locking member;
a supporting rod having a first end fixed to the first securing plate, and a second end opposite to the first end; and
a locking handle pivotably connected to the second end of the supporting rod, the locking handle being able to be locked by the locking member to keep the second securing plate clamped to the hard disk together with the first securing plate.

11. The hard disk module as claimed in claim 10, wherein the supporting rod is located between the hard disk and the connecting rod, and the hard disk comprises a connection interface facing away from the connecting rod.

12. The hard disk module as claimed in claim 11, wherein the hard disk defines a plurality of fixing holes on each of the two sidewalls, and each of the first securing plate and the second securing plate comprises a plurality of protrusions for engaging with the fixing holes.

13. The hard disk module as claimed in claim 10, wherein the second securing plate has a rotatable shaft for pivotably connecting to the second end portion of the connecting rod, the rotatable shaft is interface fit with the connecting rod.

14. The hard disk module as claimed in claim 10, wherein the second securing plate comprises an inner surface facing the first securing plate and an outer surface facing away from the first securing plate, and defines a through hole running through the inner surface and the outer surface, the locking member is disposed on the outer surface of the second securing plate, the second end of the supporting rod is able to be inserted into the through hole and the locking handle extends out of the through hole to engage with the locking member.

15. The hard disk module as claimed in claim 14, wherein the second securing plate defines a receiving groove for receiving the locking handle, the locking member and the through hole are located at two opposite end of the receiving groove.

16. The hard disk module as claimed in claim 14, wherein the locking member is a rotatable locking button, the rotatable locking button comprises a main body and a rotatable shaft, the main body is rotatable together with the rotatable shaft and has a locking portion at a lateral side thereof for locking the locking handle.

17. The hard disk module as claimed in claim 16, wherein the locking button further comprises a blocking plate connected to an end of the rotatable shaft away from the main body, the second securing plate defines a mounting hole for receiving the rotatable shaft therein, the blocking plate and the main body of the locking button are located at two opposite side of the second securing plate.

18. The hard disk module as claimed in claim 17, wherein the mounting hole has a wide end and a narrow end, the diameter of the wide end is larger than that of the blocking plate, the diameter of the narrow end is larger than that of the rotatable shaft and is smaller than that of the blocking plate.

19. The hard disk module as claimed in claim 16, wherein the main body comprises a mounting groove for receiving the main body, a bottom wall of the mounting groove defines an arc-shaped sliding slot thereon, and the main body comprises a positioning protrusion for engaging with the sliding slot to limit the range of rotatable angle of the rotatable locking button.

20. The hard disk module as claimed in claim 10, wherein the locking handle comprises a ridge-shaped projection on a surface thereof facing the locking member, the ridge-shaped projection is substantially perpendicular to a lengthwise direction of the second securing plate.

* * * * *